(12) United States Patent
Miyahira et al.

(10) Patent No.: US 6,876,963 B1
(45) Date of Patent: Apr. 5, 2005

(54) MACHINE TRANSLATION METHOD AND APPARATUS CAPABLE OF AUTOMATICALLY SWITCHING DICTIONARIES

(75) Inventors: Tomohiro Miyahira, Yamato (JP); Yoshiroh Kamiyama, Tokyo-to (JP); Hiromi Hatori, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 922 days.

(21) Appl. No.: 09/667,372

(22) Filed: Sep. 22, 2000

(30) Foreign Application Priority Data

Sep. 24, 1999 (JP) ............................................. 11-270212

(51) Int. Cl.[7] .......................... G06F 17/28; G06F 17/21
(52) U.S. Cl. ...................... 704/4; 704/2; 704/7; 704/10
(58) Field of Search ............................. 704/2, 3, 4, 7, 704/9, 277

(56) References Cited

U.S. PATENT DOCUMENTS 5,535,120 A * 7/1996 Chong et al. ................... 704/3
6,085,162 A * 7/2000 Cherny ....................... 704/277
6,182,027 B1 * 1/2001 Nasukawa et al. ............. 704/2
6,278,967 B1 * 8/2001 Akers et al. .................... 704/2

FOREIGN PATENT DOCUMENTS

JP         09-072178       9/1998

OTHER PUBLICATIONS

K. Takeda, "Pattern–Based Machine Translation", Proc. of 16th Coling, vol. 2, pp. 1155–1158, 1996.
K. Takeda, "Pattern–Based Context–Free Grammar for Machine Translation", Proc. of 34th ACL, pp. 144–151.

* cited by examiner

Primary Examiner—Talivaldis Ivars Smits
Assistant Examiner—Matthew J. Sked
(74) Attorney, Agent, or Firm—Ference & Associates

(57) ABSTRACT

The present invention provides a method, apparatus and computer-readable medium for machine translation capable of performing automatic dictionary switching in a machine translation system using a system base dictionary which registers common words and at least one domain dictionary to translate from a first language to a second language. The method comprises: determining a compound word in the input source text by analyzing the source text; setting priority of a domain dictionary including the compound word higher than that of the system base dictionary, and creating a translated text in the second language using the domain dictionary having the higher priority.

9 Claims, 4 Drawing Sheets

MACHINE TRANSLATION SYSTEM

MACHINE TRANSLATION SYSTEM

PROCESS FOR CHANGING PRIORITY

RESULT OF SOURCE TEXT ANALYSIS

MACHINE TRANSLATION METHOD AND APPARATUS CAPABLE OF AUTOMATICALLY SWITCHING DICTIONARIES

CLAIM FOR PRIORITY

This application claims priority from Japanese Application No. 11-270212 filed on Sep. 24, 1999, and which is hereby incorporated by reference as if fully set forth herein.

FIELD OF THE INVENTION

The present invention generally relates to a machine translation system, and more particularly to a machine translation method and apparatus capable of automatically switching dictionaries

BACKGROUND OF THE INVENTION

A machine translation system generally includes a system base dictionary registering common words and a user dictionary registering user unique words, as well as one or more domain dictionaries registering specialized terms for each specialized domain or field such as politics, sports, art, etc., and performs translation processing by selectively using these domain dictionaries. For example, a translation program named "Internet King of Translation" which is licensed by the present assignee in Japan, includes six domain dictionaries categorized in "Internet", "Art", "Business", "Sports", "Politics", and "Entertainment", in addition to a base dictionary. To improve translation quality, it is necessary to suitably select a dictionary, particularly a domain dictionary used for the translation. In the past, it was a common practice for a user to select a dictionary or switches to another dictionary for oneself depending on a source text to be translated.

Some techniques for automatically performing dictionary selection or switching have also been known. In the automatic dictionary switching, it would be ideal to select an appropriate domain dictionary by seizing the gist of a source text. However, it is not easy to seize the gist and, moreover, it is difficult to decide a point at which a domain dictionary should be switched to another one, in a text in which topics are shifted one after another. For this reason, a typical method currently used for automatic dictionary switching selects, in advance, particular keywords for selecting dictionaries, and selects a domain dictionary corresponding to a keyword when the keyword appears in a source text.

Another technique disclosed, for example, in Japanese Unexamined Patent Publication No. 6-60117 reads source text data stored in a data file out to a work station, analyzes a sentence structure thereof, checks whether or not a translated word in each sentence exists in each of five domain dictionaries by using a translation system, increments a translated word check counter corresponding to a dictionary including the translated word, and sets selection priority of each domain dictionary depending on the count values of the check counters.

Also, Japanese Unexamined Patent Publication No. 10-21222 discloses a technique in which a predetermined condition for translation processing is set based on document identification information to be used for identifying a document of a first language when the document is accessed. According to one embodiment thereof, a particular domain is determined by using a URL of Internet as document identification information, and a domain dictionary corresponding to the determined domain is selected.

In the case where a user selects a dictionary for oneself prior to translation, if a specialized field or domain of a source text to be translated is previously known, it would be sufficient to manually select a corresponding dictionary. However, in the case where a specialized field is not known or cannot be determined, or where one source text is related to a plurality of specialized fields, if a particular domain dictionary has been previously selected, it would be possible that inadequate translated words be selected. Also, in the system in which domain dictionaries are switched depending on keywords, adequate keywords should be determined in advance, and the determined keywords should be reviewed whenever the domain dictionaries are updated (addition of new words, deletion of old words, etc.). Furthermore, it would be difficult to determine where in the source text dictionary switching should be done.

In the system in which the selection priority of the dictionaries is established based on the frequency (count data) of translated words, as in the Japanese Unexamined Patent Publication No. 6-601117, single and compound words are not distinguished from each other. Therefore, there is an increased possibility that a wrong domain dictionary is selected when a common word has a specific meaning (e.g., an English word "tour" is commonly translated into "ryoko" (kanji) in Japanese, but in the sports field such as golf, it should be translated into "tsuah" (katakana). In the system which utilizes the document identification information (URL) as disclosed in Japanese Unexamined Patent Publication No. 10-21222, it is necessary to prepare a table for associating identification data with domains and to continue updating the table to accommodate ever-increasing Web sites.

The method and apparatus for machine translation method and apparatus capable of automatic switching dictionaries which is described in the instant invention is designed to eliminate the above drawbacks.

SUMMARY OF THE INVENTION

The present invention, in accordance with at least one preferred embodiment provides a machine translation method and apparatus performing automatic dictionaries switching based on compound words appearing in a source text. A program storage medium storing a program for implementing such machine translation method is also provided.

In accordance with the present invention, a machine translation method capable of performing automatic dictionary switching is provided in a machine translation system using a system base dictionary in which common words are registered and at least one domain dictionary to translate from a first language to a second language, which comprises the steps of: inputting a source text of the first language; determining a compound word used in the input source text by analyzing the source text; setting priority of a domain dictionary including the determined compound word higher than that of said system base dictionary; and creating a translated text of said second language using the domain dictionary having the higher priority.

In accordance with another aspect of the present invention, a machine translation apparatus for making a translation of a first language into a second language by using a system base dictionary in which common words are registered and at least one domain dictionary and automatically switching these dictionaries, is provided which comprises: an inputter for inputting a source text of said first language; a determiner for determining a compound word used in the input source text by analyzing the source text; means for setting priority of a domain dictionary including the determined compound word higher than that of said system base dictionary; and a creator for creating a translated text of said second language using the domain dictionary having the higher priority.

In accordance with another aspect of the present invention, a computer readable program storage medium storing a program for implementing a machine translation method is provided.

In the preferred embodiments of the invention, priority of a particular domain dictionary is set higher than that of a system base dictionary by setting priority of single words registered in that domain dictionary higher than that of single words registered in the system base dictionary, while priority of compound words registered in the domain dictionary is kept lower than that of compound words registered in the system base dictionary. The reason is that when the same compound words are registered in both the particular domain dictionary and the system base dictionary, it is considered preferable to use the compound words in the system base dictionary. If such consideration is not necessary, priority of both single and compound words may be set higher than that of words registered in the system base dictionary.

Note that, in this specification, a "compound word" means a meaningful word consisting of two or more single words. Since many of such compound words are unique to the respective domains, the present invention uses compound words as a trigger for dictionary switching.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
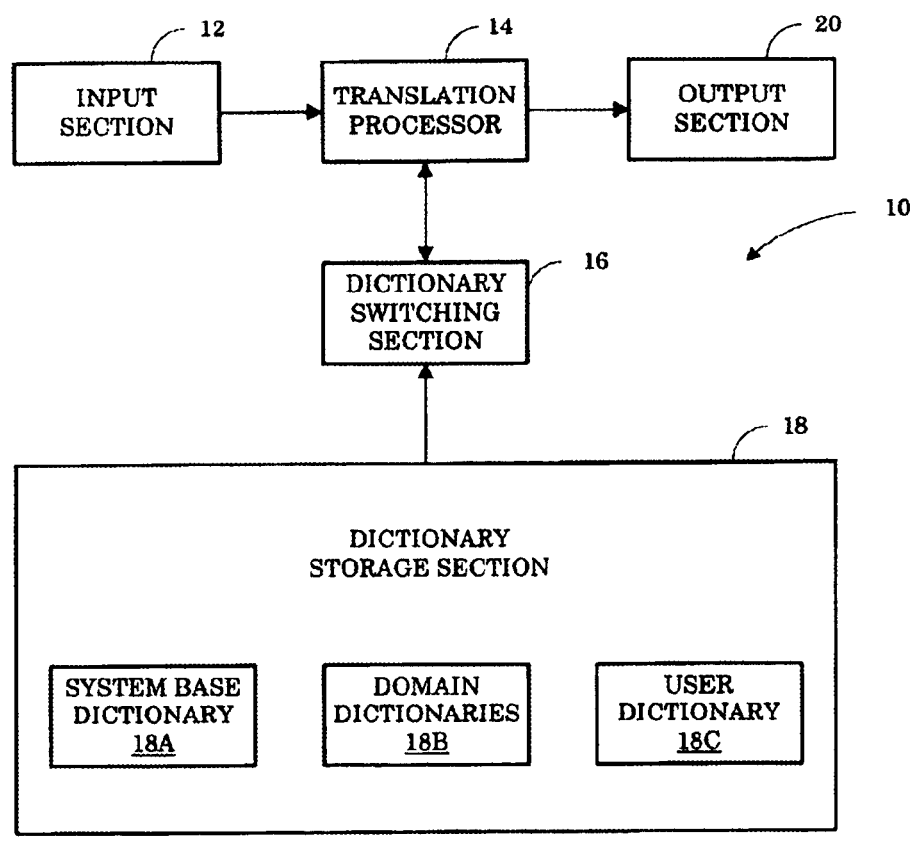
FIG. 1 is a block diagram showing a configuration of a machine translation system according to the present invention.

Referring now to FIG. 1, a machine translation system 10 according to the present invention is shown. In the embodiments described below, the machine translation system 10 performs translation from English to Japanese. However, the invention is not limited to the above translation, and can be applied to translation between any two languages. The machine translation system 10 comprises an input section 12, otherwise described as an inputter for inputting a source text of a first language (English) to be translated, a translation processor 14 for creating a translated text of a second language (Japanese) from the input source text, a dictionary switching section 16 for automatically switching dictionaries to be used in the translation processor 14, a dictionary storage section 18 for storing a plurality of dictionaries to be used in the translation processor 14, and an output section 20 for outputting the translated text created by the translation processor 14.

The input section 12 may be a keyboard, a character recognition device, a voice recognition device, an Internet Web page screen or any other input means which can input a source text to the translation processor 14. The translation processor 14 may be a conventional machine translation engine. Examples of such translation engine are described in K. Takeda, "Pattern-Based Context-Free Grammar for Machine Translation" Proc. of 34th ACL, pp. 144–151, 1996, and K. Takeda, "Pattern-Based Machine Translation" Proc. of 16th Coling, Vol. 2, pp. 1155–1158, 1996.

The dictionary switching section 16 constitutes an essential portion of the invention which, as described later, automatically switches priority of domain dictionaries stored in the dictionary storage section 18 (e.g. a hard disk drive). The dictionary storage section 18 stores a system base dictionary 18A in which common words are registered, at least one domain dictionary 18B in which words in a particular domain are registered, and a user dictionary 18C in which user unique words are registered. The user dictionary 18C may be optional. Note that "words" registered in the respective dictionaries include both single words and compound words. The output section 20 outputs a translated text created by the translation processor 14, in a predetermined form such as voice, display, printing, file storage or the like.

Figure 2:
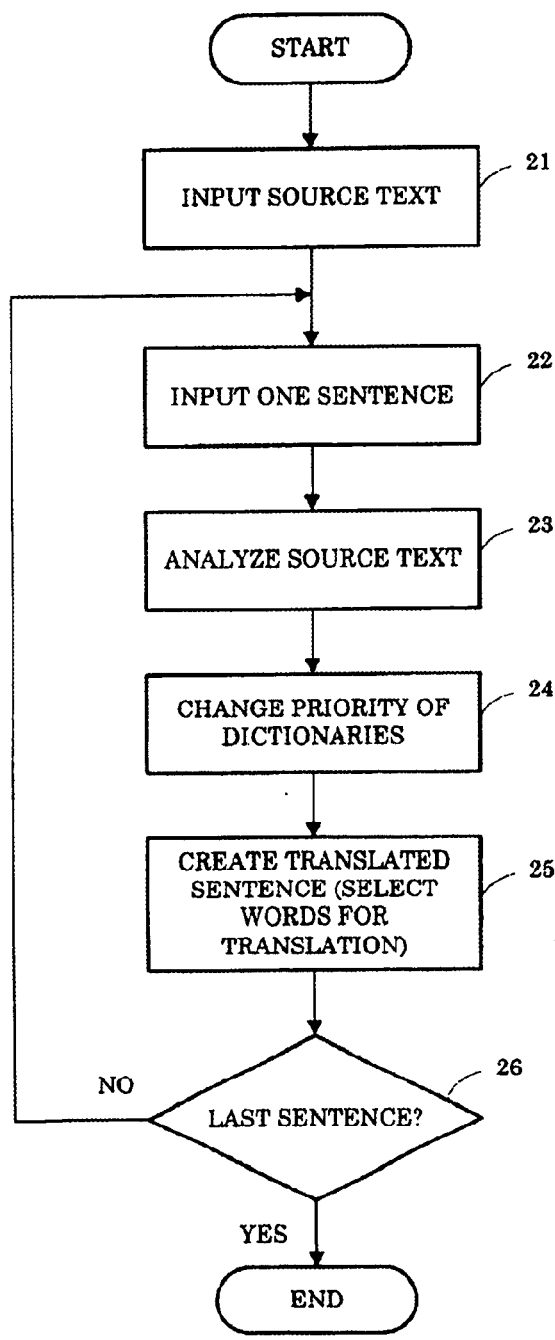
FIG. 2 is a flow chart showing a flow of translation processing performed in the machine translation system of FIG. 1.

A translation processing flow in the machine translation system 10 of FIG. I is shown in FIG. 2. In a first step 21, an English source text is input from the input section 12. Next, in a step 22, one sentence is extracted from the input source text. In the case of English, a sentence may be delimited when (1) a word ends with a period, and a next word starts with a capital letter, or (2) a word ends with an exclamation mark, a colon or a semicolon. However, it should be noted that there are some expressions which satisfy the above condition (1) but do not appear at a sentence end, such as "Mr.". These expressions are stored as data and a word in a source text which satisfies the condition (1) is compared therewith. If there is no match, a sentence is delimited. Additionally, when a period is sandwiched between numerical letters, a sentence is delimited if there is a space immediately after the period, and a sentence continues if there is no such space.

After a sentence is extracted, it is analyzed in a next step 23. In the analyze step 23, the extracted sentence is analyzed to find in the sentence what is a subject, what is a verb, and so on, so that a sentence structure is determined; During the analysis, compound words in all the dictionaries as well as grammatical rules are used to determine by use of a determiner, each element of the sentence. After the analysis of the source text sentence is completed, the process proceeds to a step 24 where priority of the domain dictionaries is changed. In this embodiment, priority of single words in a domain dictionary including a compound word actually used in the sentence analyzed in the step 23 is set higher than that of single words in the system base dictionary (hereinafter simply referred to as "base dictionary") while priority of the compound words is kept the same as before, that is, it is kept lower than that of the base dictionary. Details of this priority change will be described later with reference to FIG. 3. In a next step 25, a translated sentence is created by using the domain dictionary having priority of the single words changed. Appropriate translated words can be obtained by using translated words for the single words in the domain dictionary having the higher priority. In a next step 26, it is checked whether a sentence for which the translated sentence has been created is the last sentence of the source text input in the step 21. If it is not the last sentence, the process returns to the step 22, otherwise the process is terminated.

As described above, in the preferred embodiment, only the priority of single words of the domain dictionary is set higher than the base dictionary while the priority of compound words is kept lower. The reason is that when the same compound word is listed in both the base and domain dictionaries, it is considered preferable to use a compound word registered in the base dictionary. However, since possibility of having the same compound word in both the domain and base dictionaries is quite low, there would be no problem in changing the priority of both the single and compound words in the domain dictionary at the same time if such consideration is not required.

Referring now to FIG. 2, the process flow shown is described by exemplifying an actual source text. In an example described below, it is assumed that an Internet Web page is translated and the following six dictionaries are used as domain dictionaries 18B. However, the present invention can also be applied to any other translation and can use different dictionaries other than the following ones.

Domain dictionaries 18B
Internet
Art
Business
Sports
Politics
Entertainment

In addition to the foregoing six domain dictionaries, a base dictionary 18A and an optional user dictionary 18C are also stored in the dictionary storage section 18. Priority of these dictionaries is assumed to be ordered initially from the highest to the lowest as follows:

1. User dictionary
2. Base dictionary
3. Internet
4. Art
5. Business
6. Sports
7. Politics
8. Entertainment The priority order of the domain dictionaries from 3 to 8 shown above are for an illustration purpose only, and can be set by use of a setter, in any order. For example, it may be the order of dictionaries which are found when the translation engine is initialized. In an initial state, priority of all the domain dictionaries is set lower than that of the base dictionary. However, it is possible to set priority of a particular domain dictionary selected by a user (e.g. a sports domain dictionary) higher than that of the base dictionary. In that case, priority of the other domain dictionaries is kept lower than that of the base dictionary. The priority may be controlled in any manner. For example, dictionary identification information such as dictionary names may be listed according to the priority order. Such list of the priority order may be retained in a predetermined memory region (e.g. a portion of a main memory) of a computer system that executes the process flow shown in FIG. 2.

In the machine translation using the dictionaries as described above, it is assumed that the following two sentences are input in the first step 21.

"Tom Miyahira led the tour at 24.5%. On par-5 holes Hatori made a birdie an amazing 42.5% of the time."

In the next step 22, one sentence is extracted by delimiting the sentence at a point where the above described condition (1) or (2) is satisfied. In the above example, the first period is found between "24" and "5". In this case, since there is no space between the period and "5", the sentence is not delimited here. The next period is found after "%", and a word "On" subsequent thereto starts with a capital letter. Therefore, the following sentence is extracted by delimiting the sentence at that point. "Tom Miyahara led the tour at 24.5%."

Next, the source text analyzing step 23 is executed for the sentence extracted in the step 22 by using all the foregoing dictionaries from 1 to 8. As well known in the art, each dictionary includes single and compound words and stores part of speech information for each word. Additionally, the base dictionary also stores grammatical rules such as:

One noun can constitute a noun phrase.
One verb can constitute a verbal phrase.
A verbal phrase and a noun phrase can constitute another verbal phrase.
A noun phrase and a verbal phrase can constitute a sentence.

Figure 4:
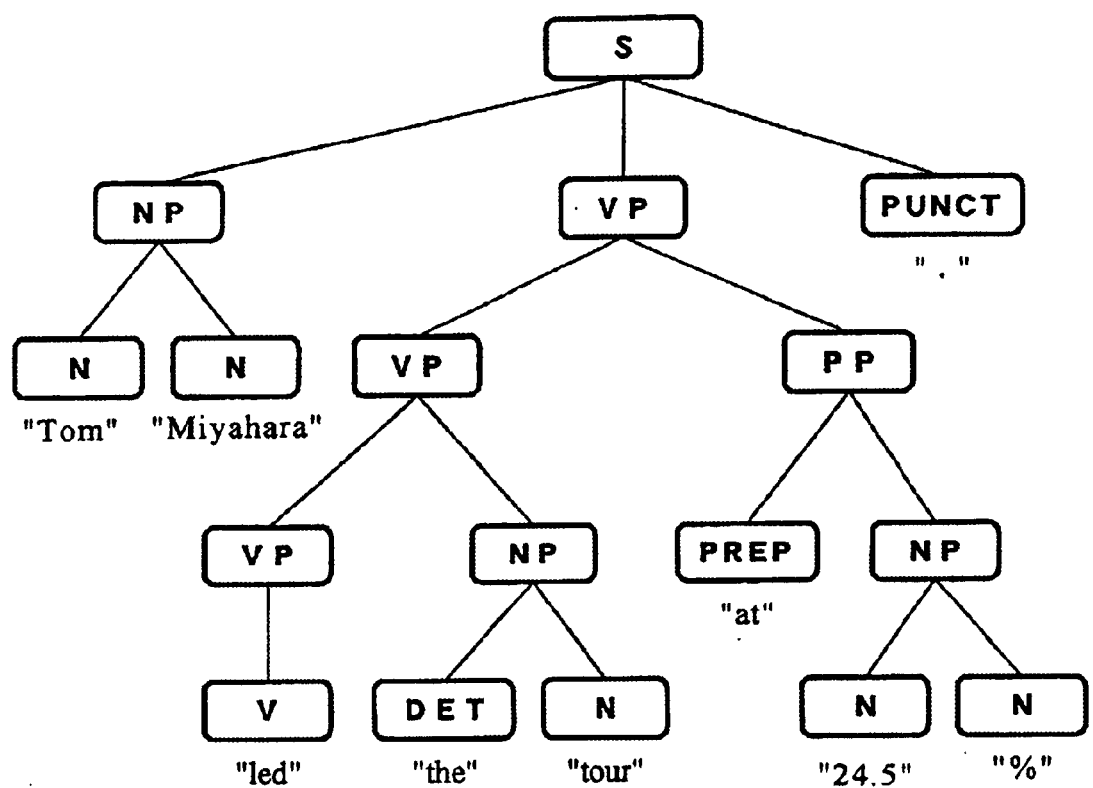
FIG. 4 is a parse tree showing the result of a source text analysis in the flow chart of FIG. 2.

The source text analyzing step 23 prepares a parse tree shown in FIG. 4 by using such information. Since it is well known in the art how to prepare such parse tree, detail thereof is not described here. The abbreviations shown in FIG. 4 have the following meaning:

DET: article
N: noun
NP: noun phrase
PP: prepositional phrase
PREP: preposition
PUNCT: punctuation mark
S: sentence
V: verb
VP: verbal phrase The parse tree of FIG. 4 illustrates that a sentence S is composed of a noun phrase NP, a verbal phrase VP and a punctuation mark PUNCT. The sentence S has three branches of which the left one, that is, the first noun phrase NP is composed of two nouns "Tom" and "Miyahira". This noun phrase is a compound word and, in this example, registered only in the sports domain dictionary. The center branch of the parse tree, that is, the verbal phrase VP following the noun phrase NP, is composed of a second verbal phrase VP and a prepositional phrase PP. The second verbal phrase VP is composed of a verbal phrase constituted by a verb "led" and a noun phrase constituted by an article "the" and a noun "tour". The prepositional phrase PP is composed of an article "at" and a noun phrase constituted by two nouns "24.5" and "%". The last punctuation PUNCT in the right branch is a period".".

After completion of the analysis for the source text, the process proceeds to the step 24 for changing priority of dictionaries. In the above example, since the compound word "Tom Miyahira" is used from the sports domain dictionary, the process passes through an affirmative path from a step 31 in FIG. 3 to be described later. As a result, the priority list of the dictionaries is changed as follows:

1. User dictionary
2. Sports
3. Base dictionary
4. Internet
5. Art
6. Business

7. Politics
8. Entertainment

In the next step 25, a translated sentence is created by use of a creater in accordance with this changed priority list. Since the first compound word "Tom Miyahira" does not exist in the other dictionaries, a word "tomu miyahira" (katakana) in the sports domain dictionary is used as a translated word. Further, since single words in the sports domain dictionary have higher priority than the base dictionary, a translated word "tsuah" (katakana) from the sports domain dictionary is used for the single word "tour". Although a translated word "ryokoh" (kanji) is registered in the base dictionary for the word "tour", this translated word is not used since its priority is lower than the sports domain dictionary. Eventually, the following translated sentence (Japanese) is created.

"tomu miyahira wa 24.5% no tsuah wo michibiki-mashita."

Since the above sentence is not the last sentence of the source text, the process returns from the step 26 to the step 22 where the next sentence, "On par-5 holes Hatori made a birdie an amazing 42.5% of the tour.", is extracted, and the same process is iterated. In this iteration, compound words unique to the sports domain dictionary are not detected, but the priority of the single words in the sports domain dictionary is still kept higher than that of the base dictionary, as described later with reference to FIG. 3. Accordingly, for the word "birdie", for example, which is registered in both the sports domain dictionary and the base dictionary, a translated word "bahdii" (katakana) from the sports domain dictionary is used, and a translated word "kotori" (kanji) from the base dictionary is not used. This word selection procedure is also applied to the other words in the same manner. A translated sentence (Japanese) created by the second iteration is as follows.

"pah 5 no hohru de, hatori wa tohji no odorokuyohna 42.5% (de) bahdii wo dashimashita."

Since the source text has only two sentences in the above example, the process reaches the last sentence by the second iteration. Accordingly, the process is terminated after the second translated sentence is created. Note that these translated sentences were actually output from a machine translation system according to the present invention. "(de)" (hiragana) in the second translated sentence may be revised by the user, if necessary.

Figure 3:
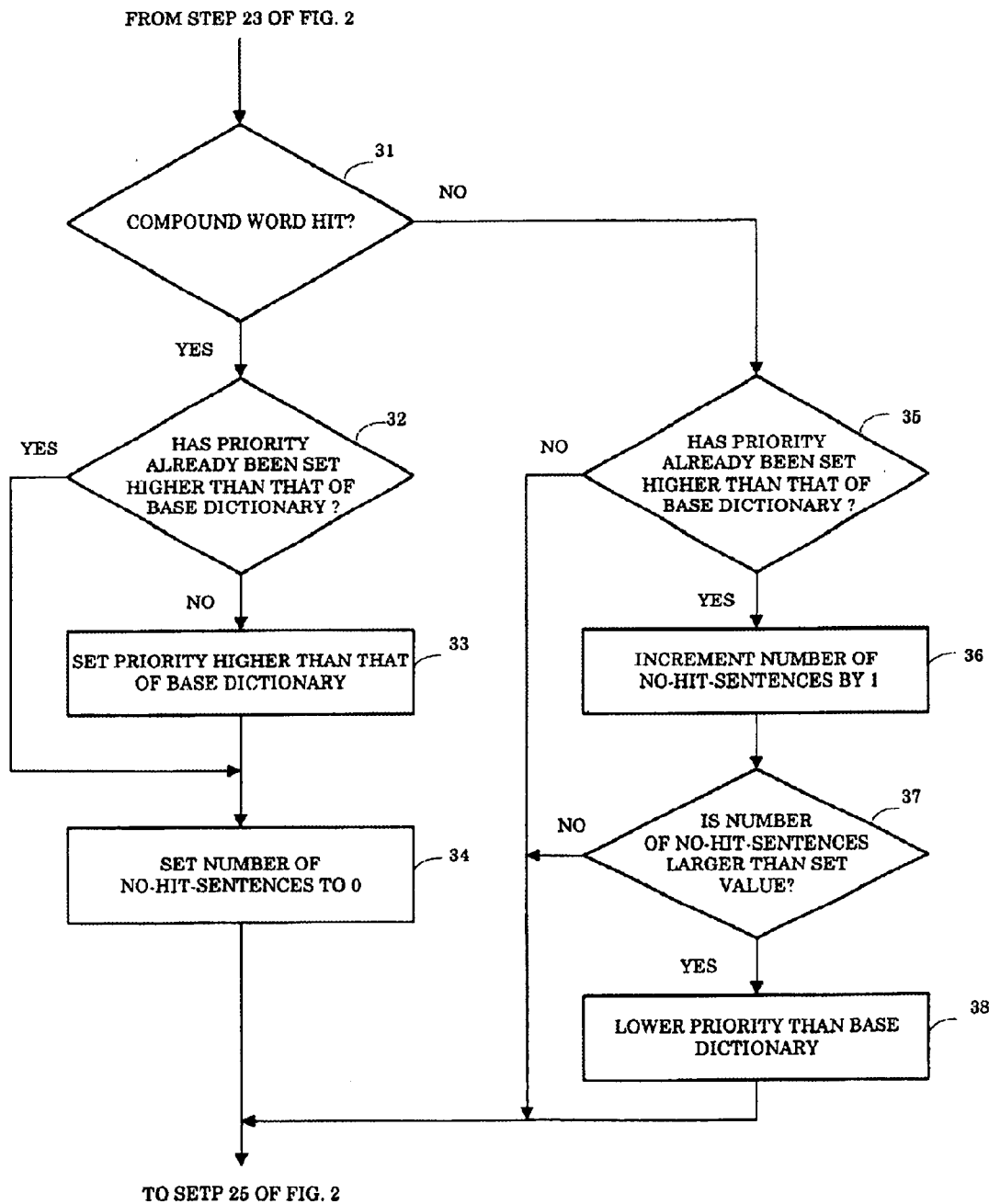
FIG. 3 is a flow chart showing a detail of process for changing priority of dictionaries in the flow chart of FIG. 2.

Referring now to FIG. 3, the process for changing the priority of the domain dictionaries will be described in detail. The process shown in FIG. 3 is executed for each of the domain dictionaries. In a first step 31, it is checked whether any compound word registered in the domain dictionary hits (or is used), based on the result of the source text analysis as shown in FIG. 4. If hits, the process proceeds to a step 32 where it is checked whether the priority of the domain dictionary has already been set higher than that of the base dictionary by referring to, for example, the above described priority list. If the priority of the domain dictionary has already been set higher, the process proceeds to a step 34, otherwise to a step 33. In the step 33, the priority of the domain dictionary is set higher than that of the base dictionary. In the above example, the compound word "Tom Miyahira" registered in the sports domain dictionary hit and, therefore, the priority of the sports domain dictionary was set higher than that of the base dictionary. In the next step 34, the number of no-hit-sentences, that is, the number of sentences where any compound word registered in the domain dictionary does not hit is reset to 0. Then the process proceeds to the step 25 in FIG. 2. This number of no-hit-sentences, which is maintained for each of the domain dictionaries, counts the number of consecutive sentences which do not include any compound word in that dictionary (i.e. no hit) after the last hit. This count value is used for lowering the priority of a particular domain dictionary below the base dictionary when compound words in that domain dictionary do not hit during translation of a predetermined number of consecutive sentences (e.g. 10 sentences), which is considered that the topic of that particular domain is over.

If the compound words in the domain dictionary do not hit in the step 31, the process proceeds to a step 35. The step 35, which is the same as the step 32, checks whether the priority of the domain dictionary has already been set higher than that of the base dictionary. If the priority has not been set higher, the process returns to the flow of FIG. 2 without any further action. If the priority of the domain dictionary has been set higher than that of the base dictionary, the process proceeds to a step 36 to increment the number of no-hit-sentences by 1. Next, in a step 37, it is checked whether the incremented number of no-hit-sentences is larger than a predetermined set value (e.g. 10). If the number of no-hit-sentences is equal to or smaller than the set value, the process returns to the flow of FIG. 2, otherwise, the process proceeds to a step 38 to lower the priority of the domain dictionary below the base dictionary. In the actual example of the flow in FIG. 2, the priority of the sports domain dictionary was kept higher than that of the base dictionary in the second iteration because the process proceeded to a negative (NO) path from the step 37. As described above, the priority here is the one of single words. However, the priority may be of both single and compound words. Also, the set value for the number of no-hit-sentences may be different from 10.

As described above, the flow of FIG. 3 is executed for each of the domain dictionaries. Accordingly, it is possible that priority of two or more domain dictionaries is set higher than that of the base dictionary. For example, when a compound word registered in the political domain dictionary appears in a next sentence with the priority of the sports domain dictionary being higher than that of the base dictionary, the priority of the political domain dictionary is also set higher than that of the base dictionary. In that case, the priority of the domain dictionary whose compound word hits later is preferably set higher. Accordingly, the priority list of the dictionaries is as follows:

1. User dictionary
2. Politics
3. Sports
4. Base dictionary
5. Internet
6. Art
7. Business
8. Entertainment Although the preferred embodiments of the present invention have been described with specific examples, those skilled in the art will appreciate that various changes and modifications can be made therein without departing form the scope of the spirit of the present invention. For example, the flows shown in FIGS. 2 and 3 can be executed by either dedicated hardware or software in a general purpose computer system such as a personal computer. In the latter case, a program for executing the flows shown in FIGS. 2 and 3 is stored in a computer readable program storage medium such as a floppy disk, CD-ROM, hard disk or the like. Of course, the present invention also includes such program storage medium.

What is claimed is:

1. In a machine translation system for making a translation of a first language into a second language by using a system base dictionary in which common words are registered and at least one domain dictionary, a machine translation method capable of automatically switching dictionaries, comprising the steps of:

inputting a source text of said first language;

determining a compound word used in the input source text by analyzing a source text;

setting priority of a domain dictionary including the determined compound word higher than that of said system base dictionary; and creating a translated text of said second language using a domain dictionary having a higher priority.

2. The machine translation method according to claim 1, wherein said setting step sets priority of single words registered in a domain dictionary including said determined compound word higher than that of single words registered in said system base dictionary.

3. The machine translation method according to claim 1, further comprising a step of extracting one sentence from the source text of said first language, whereby said determining step, said setting step, and said creating step are performed for each extracted sentence.

4. The machine translation system according to claim 3, wherein said setting step lowers the priority of said domain dictionary including said determined compound word below that of said system base dictionary when compound words included in said dictionary are not used through a predetermined number of sentences after the priority of said domain dictionary has been set higher than that of said system base dictionary.

5. A machine translation apparatus for making a translation of a first language into a second language by using a system base dictionary in which common words are registered and at least one domain dictionary for automatically switching said dictionaries, comprising:

an inputter which inputs a source text of said first language;

a determiner which determines a compound word used in the input source text by analyzing a source text;

a setter for setting which sets priority of said domain dictionary including a determined compound word higher than that of said system base dictionary; and a creator which creates a translated text of said second language using said domain dictionary having the higher priority.

6. The machine translation apparatus according to claim 5, wherein said setter sets priority of single words registered in said domain dictionary including said determined compound word higher than that of single words registered in said system base dictionary.

7. The machine translation apparatus according to claim 5, further comprising an extractor which extracts one sentence from the source text of said first language, whereby said determiner, said setter, and said creator which creates said translated text are used for each extracted sentence.

8. The machine translation system according to claim 7, wherein said setter lowers a priority of said domain dictionary including said determined compound word below that of said system base dictionary when compound words included in said domain dictionary are not used through a predetermined number of sentences after said priority of said domain dictionary has been set higher than that of said system base dictionary.

9. A program storage device readable by machine for tangibly embodying a program of instructions executable by said machine to perform a method for making a translation of a first language into a second language by using a system based dictionary in which common words are registered and at least one domain dictionary, a machine translation method capable of automatically switching dictionaries, said method comprising the steps of:

inputting a source text of said first language;

determining a compound word used in the input source text by analyzing a source text;

setting priority of a domain dictionary including the determined compound word higher than that of said system base dictionary; and creating a translated text of said second language using a domain dictionary having a higher priority.

* * * * *